Patented May 3, 1932 1,856,326

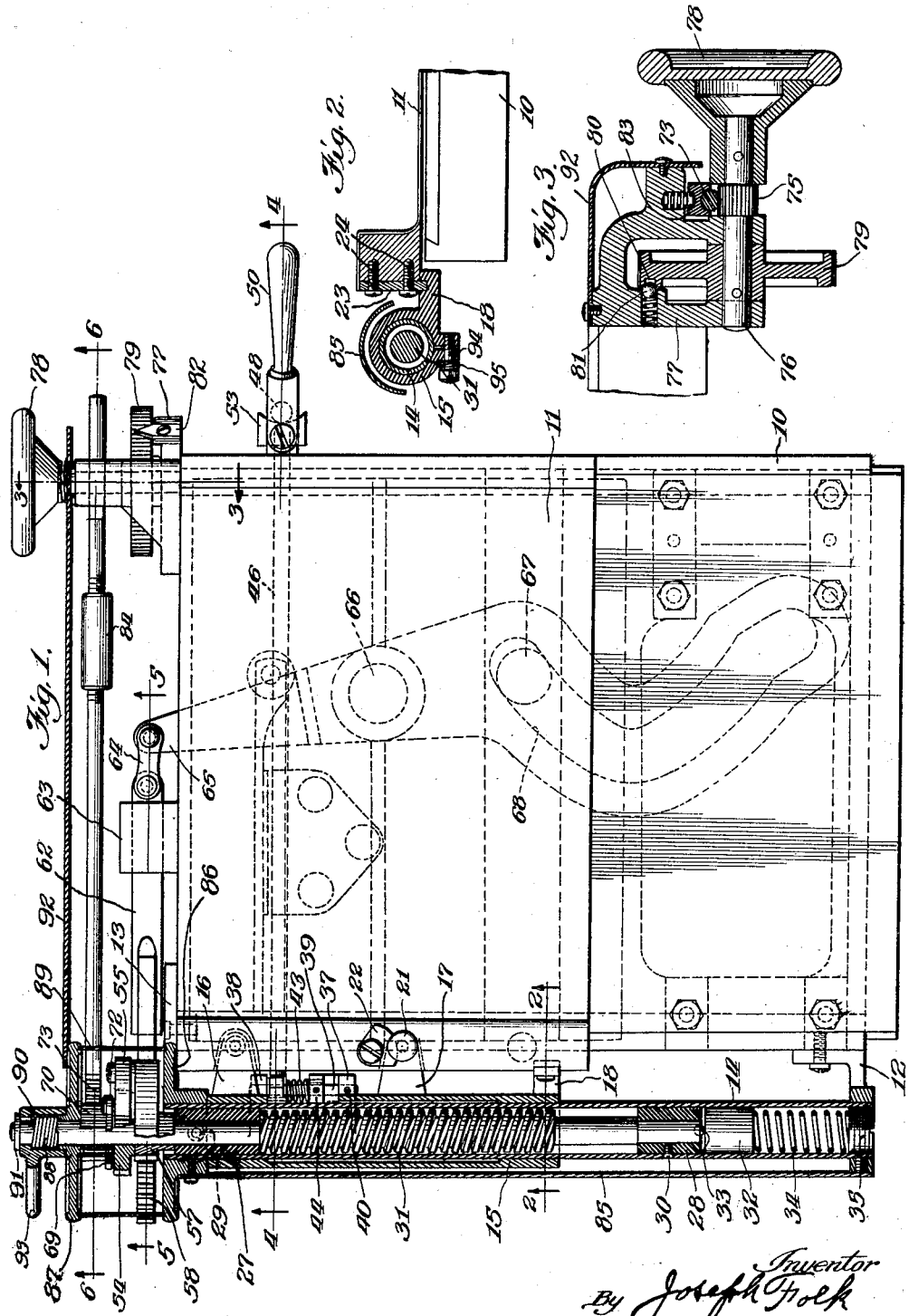

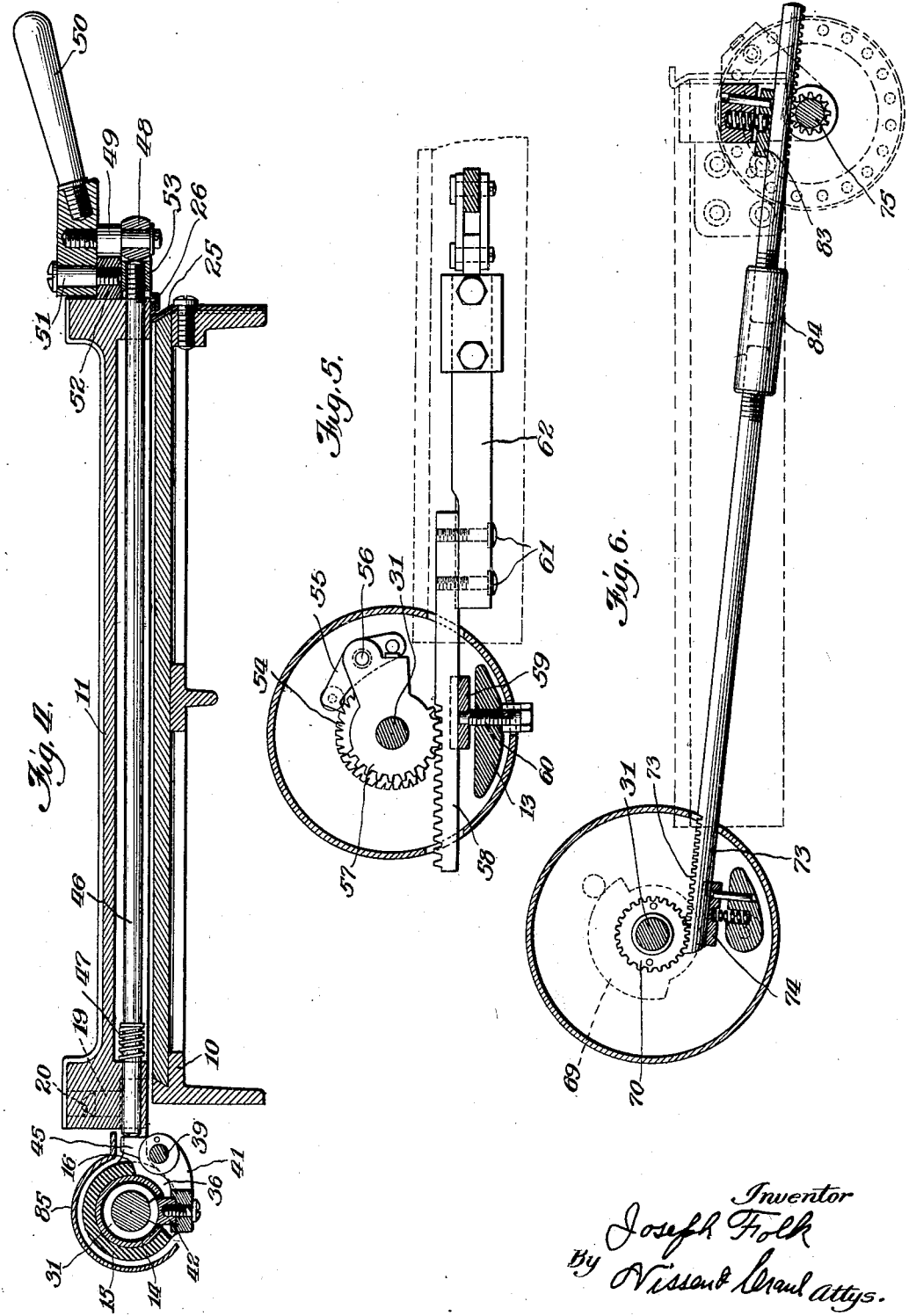

UNITED STATES PATENT OFFICE

JOSEPH FOLK, OF LA PORTE, INDIANA, ASSIGNOR TO U. S. SLICING MACHINE COMPANY, OF LA PORTE, INDIANA, A CORPORATION OF INDIANA

FEED MECHANISM FOR SLICING MACHINES

Application filed November 16, 1927. Serial No. 233,538.

This invention relates to mechanism for periodically feeding the work support of a slicing machine toward the cutting plane of a slicing knife, and has for one of its objects the provision of mechanism of the class named which shall be of improved construction and operation.

A further object is to provide feed mechanism having an enclosed feed screw.

A further object is to provide feed mechanism in which the work supporting table is provided with a mounting co-axial with the feed screw.

Other objects and advantages will appear from the following description.

The invention is exemplified in the combination and arrangement of parts shown in the accompanying drawings and described in the following specification, and it is more particularly pointed out in the appended claims.

In the drawings—

Figure 1 is a top plan view of a work support for a slicing machine, with parts in section, showing one embodiment of the present invention;

Fig. 2 is a section on line 2—2 of Fig. 1;
Fig. 3 is a section on line 3—3 of Fig. 1;
Fig. 4 is a section on line 4—4 of Fig. 1;
Fig. 5 is a section on line 5—5 of Fig. 1; and
Fig. 6 is a section on line 6—6 of Fig. 1.

The numeral 10 designates the reciprocating under table of a slicing machine having a work supporting plate or feed table 11 slidably mounted thereon. Brackets 12 and 13 are secured to the under table 10 at one side thereof and support a tubular guide 14. A sleeve 15 is slidably mounted on the guide 14 and is removably clamped to the work support 11. The sleeve 15 is provided with laterally extending brackets 16, 17 and 18. The bracket 16, as shown in Fig. 4, is provided with a dowel pin 19 extending into a socket 20 in the feed table 11. The bracket 17 is also provided with a dowel pin 21 which extends through the table 11 and is engaged by a locking segment 22 which holds the pin 21 fixed in place in its socket in the table 11. The bracket 18, as shown more clearly in Fig. 2, is provided with a notch which receives the lower end of a locating bar 23 secured to the table 11 by screws 24. It will be apparent that when the locking segment 22 is in place in the notch provided therefor in the pin 21, the feed table 11 will be rigidly fixed to the sleeve 15. By rotating the locking segment 22 it may be disengaged from the pin 21 so that the table 11 may be lifted from the under table. The side of the table 11 opposite the sleeve 15 rests freely on a guide plate 25 secured to the under table 10. A retaining plate 26 is secured to the feed table to hold the feed table against upward movement at the side opposite the feed screw. When the feed table has been lifted from its dowel pins it may be moved slightly to the right, as viewed in Fig. 4, to free it from the plate 25.

A pair of bushings 27 and 28 are mounted within the tubular guide 14 and held in place by screws 29 and 30, respectively. A feed screw 31 is journaled in the bushings 27 and 28 and disposed within the tubular guide 14. The threads on the screw 31 form a shoulder which bears against the end of the bushing 27 to hold the feed screw against backward movement in the direction of its axis. A block 32 is slidably mounted in the guide 14 and is pressed against a ball-bearing 33 by means of a spring 34. The ball 33 bears against the end of the feed screw 31 to hold the feed screw always in contact with the end of the bushing 27 to prevent uneven slices due to longitudinal movement of the feed screw. A plug 35 is threaded in the end of the tubular guide 14 to hold the spring 34 in place.

The sleeve 15 is provided with an opening 36 extending through the wall thereof and ears 37 and 38 are mounted on the sleeve at opposite ends of the opening. A pin 39 is mounted in the ears 37 and 38 and fixed therein by a screw 40. A lever 41 is pivoted on the pin 39 and carries a nut segment 42 having teeth extending through a slot in the lower side of the tubular guide 14, as shown in Fig. 4, to engage the threads on the feed screw 31. A spring 43 surrounds the pin 39 and has one end attached to a collar 44 fixed to the pin 39 and the other end attached to the lever 41.

This spring operates to hold the segmental nut 42 in engagement with the threads of the feed screw. The lever 41 is provided with an operating lug 45 engaged by the end of a plunger rod 46 mounted in the feed table 11. A spring 47 normally acts to retract the plunger rod but the rod may be projected to press upon the lug 45 and withdraw the segmental nut 42 from the feed screw, thus freeing the feed table for movement longitudinally of the screw. The end of the rod 46 opposite the feed screw bears against a roller 48 journaled on a pin 49 carried by a hand lever 50 pivoted at 51 on a bracket 52 secured to the feed table 11. The rod 46 carries a cam 53 for engaging the roller 48 so that when the lever 50 is swung laterally in either direction, the roller 48 will press inwardly on the rod 46 and operate the lever 41 to free the segmental nut 42 from the feed screw. To slide the feed table in either direction therefore it is only necessary to press laterally on the handle 50 in the direction in which it is desired to move the table. The first effect will be to release the segmental nut and further pressure will then slide the feed table. The connection between the handle 50 and the lever 41 will not interfere with removal of the feed table since the end of the rod 46 is free to move away from the operating lug 45 on the lever 41 when the feed table is lifted.

The feed screw 31 is operated by means of a ratchet wheel 54 fixed to the projecting portion of the feed screw, as shown in Figs. 1 and 5. The ratchet wheel 54 is operated by a pawl 55 mounted at 56 on a segmental pinion 57. The pinion 57 is journaled on the screw spindle 31 and meshes with a rack bar 58. The bar 58 is held in mesh with the pinion 57 by means of a guide shoe 59 supported by an adjustment screw 60 from the bracket 13. The rack 58 is adjustably connected at 61 to an operating bar 62 guided in a guide block 63 secured to the under table 10. The end of the bar 62 is connected by links 64 to an operating lever 65 pivotally mounted at 66 beneath the under table 10 and oscillated by a roller 67 which travels in a cam slot 68 in the lever 65. The roller 67 is mounted on the connecting link which reciprocates the under table in a manner well known in the art. It will be apparent that the reciprocation of the under table will oscillate the lever 65, reciprocating the rack bar 58, and periodically operating the ratchet wheel 54 to impart feeding movement to the screw 31. The amount of movement imparted to the screw 31 at each reciprocation of the under table and consequently the thickness of the slices, is controlled by an adjustable cam or shroud 69 which is secured to a pinion 70 journaled on the spindle 31. A roller 72 mounted on the pawl 55 travels on the shroud 69 to control the contact of the pawl 55 with the ratchet 54.

The pinion 70 meshes with a rack 73 which is held in mesh with the pinion 70 by a spring-pressed guide shoe 74. The opposite end of the rack 73 engages a pinion 75 on a spindle 76 journaled in a bracket 77 mounted on the under table 10. The spindle 76 carries a hand wheel 78 by means of which it may be rotated to adjust the rack 73 and consequently the position of the shroud 69. A wheel 79 is fixed to the spindle 76 and is provided with spaced depressions 80 which engage a spring-held ball 81 to retain the spindle 76 in its adjusted positions. A pointer 82 co-operates with a suitable index on the wheel 79 to indicate the thickness of slices for the various positions of adjustment of the hand wheel 78. A spring-held guide 83 holds the rack 73 in mesh with the pinion 75. The rack 73 may be provided with a turnbuckle adjustment 84 for adjusting the relative position of the hand wheel and shroud so that the thickness of slices will correspond with the index on the hand wheel.

A cover plate 85 is mounted on the brackets 12 and 13 and extends over the tubular guide 14 and the sleeve 15 to protect these parts from dirt and to conceal them from view to give a more attractive appearance to the machine.

The ratchet mechanism for driving the screw 31 is enclosed in a housing comprising a circular plate 86 forming a part of the bracket 13. The side of the housing opposite the plate 86 is closed by a plate 87 which engages a cylindrical enclosure 89 interposed between the two circular end members. A spring 88 fits closely about the projecting end of the screw shaft and has its outer end attached to a sleeve 90 which encloses the spring 88 and bears against a washer 91 secured to the end of the screw shaft. A handle 93 is attached to the sleeve 90 and the spring 88 forms a one-way drive between the sleeve 90 and the screw 31 to enable the table 11 to be advanced by rotation or oscillation of the handle 93. A cover 92 is supported on the bracket 77 and the plate 87 and covers operating mechanism for the ratchet drive. This not only protects the parts covered from dust, but prevents contact of an extra long piece of meat therewith.

The sleeve 15 is split along its lower side and provided with lugs for receiving adjustment screws 94, as shown in Fig. 2. Each screw 94 is provided with a spring 95 placed between the head of the screw and the cooperating lug. These springs automatically tend to close the slit in the sleeve 15 and maintain a close fit between the sleeve 15 and the hollow guide 14, thus automatically compensating for any wear between the sleeve and guide. The force of the springs can be regulated by adjusting the screws 94.

The pressure exerted by the sleeve 15 on the guide 14 assists in preventing uneven slices as it produces sufficient friction to prevent over-feed of the table which might otherwise result from backlash of the screw or other loosely fitting parts.

I claim:—

1. In a slicing machine, a reciprocating table, a tubular guide mounted on said table, bearings within said guide, a screw spindle journaled within said bearings and having a shoulder for limiting longitudinal movement thereof in one direction, a spring-pressed abutment member mounted within said tubular guide, and a ball-bearing interposed between one end of said screw spindle and said abutment member to hold said screw spindle in the position in which movement thereof is limited by said shoulder.

2. In a slicing machine, a reciprocating table, a work support mounted on said table, a tubular guide mounted on said table, a screw spindle journaled within said guide, means connecting said screw spindle with said work support to feed said work support when said spindle is rotated, and a guard cover for said tubular guide.

3. In a slicing machine, a reciprocating table, a work support slidably mounted at one edge thereof on said table, a sleeve connected with said work support adjacent the opposite edge thereof, a tubular guide mounted on said table and extending through said sleeve, a feed screw journaled in said tubular guide, a segmental nut mounted on said sleeve and engaging said screw spindle, and a guard cover disposed over said tubular guide and sleeve.

4. In a slicing machine, a reciprocating table, a pair of brackets mounted on said table, a tubular guide carried by said brackets, a sleeve slidably mounted on said guide, a work support having one edge thereof secured to said sleeve and having its opposite edge slidably mounted on said table, a screw spindle journaled in said tubular guide, means for connecting said work support with said screw spindle to feed said work support when said spindle is rotated, and a guard plate mounted on said brackets and covering said tubular guide and sleeve.

5. In a slicing machine, a reciprocating table, a tubular guide mounted adjacent one edge of said table, a sleeve slidably mounted on said guide, a work support having one edge thereof slidably mounted on said reciprocating table, inter-engaging dowel pins and sockets for securing the other edge of said work support to said sleeve, means for locking said work support and sleeve together, a segmental nut mounted on said sleeve, a screw spindle journaled in said tubular guide, said nut being movable into and out of engagement with said screw spindle, and means mounted on said work support for moving said nut, said last-named means having a detachable connection with said nut.

6. In a slicing machine, a table, a tubular guide mounted on said table, a screw spindle journaled within said guide, a sleeve slidably mounted on said guide, a pair of brackets extending laterally from said sleeve and having dowel pins thereon, a work support having sockets for receiving said dowel pins, means for locking one of said dowel pins in its socket to hold said work support and sleeve in fixed relation to each other, a lever journaled on said sleeve, a segmental nut carried by said lever for engaging said feed screw, a plunger bar mounted on said work support and releasably engaging said lever, and an operating handle mounted on said work support for moving said plunger bar to disengage said segmental nut from said screw spindle.

7. In a slicing machine, a table, spaced brackets on said table, a tubular guide mounted in said brackets, a screw spindle journaled in said tubular guide, a sleeve slidably mounted on said guide, a work support having one edge thereof detachably connected with said sleeve and having the other edge thereof slidably mounted on said table, a segmental nut mounted on said sleeve and releasably engaging said screw spindle, said spindle having an extension projecting beyond the end of said tubular guide, a ratchet wheel secured to the projecting end of said spindle, a pinion journaled on the projecting end of said spindle, a pawl connected with said pinion and engaging said ratchet wheel, a rack meshing with said pinion, and means for reciprocating said rack to impart feeding movement to said ratchet wheel and spindle.

8. In a slicing machine, a table, a pair of brackets mounted on said table, a tubular guide supported by said brackets, a screw spindle journaled within said guide, a sleeve slidably mounted on said guide, a work support detachably connected with said sleeve, a segmental nut mounted on said sleeve and releasably engaging said screw spindle, means mounted on said work support for disengaging said nut from said spindle, said spindle having a portion thereof projecting beyond one of said brackets, ratchet mechanism mounted on said extension for operating said spindle, and means mounted on said table for adjusting said ratchet mechanism to control the amount of movement imparted thereby to said spindle.

9. In a slicing machine, a table, a work support slidably mounted on said table, a feed screw mounted on said table at one side thereof, means for connecting said work support to said feed screw to move said work support on said table when said feed screw is rotated, a ratchet wheel secured to said feed screw, a pawl for operating said ratchet wheel, a pinion journaled on said feed screw, a shroud secured to said pinion for controlling the operation of said pawl, a rack engaging said pinion, a spindle having a pinion thereon engaging said rack, a hand wheel for rotating said spindle, means for holding said spindle in various adjusted positions, and an indicator co-operating with said spindle for indicating the thickness of slices corresponding to the different positions of said hand wheel.

10. A slicing machine comprising a table, a feed screw journaled on said table adjacent one side thereof, a work support mounted on said table, means connecting said work support with said feed screw to move said work support on said table when said feed screw is rotated, ratchet mechanism for operating said feed screw, a cam for controlling said ratchet mechanism, a rod for shifting said cam, a hand wheel mounted on table at the side thereof opposite said feed screw, rack and pinion mechanism connecting said rod and hand wheel, an indicator co-operating with said hand wheel for indicating thickness of slices, and means for adjusting said rod to set said indicator to correspond with the position of said cam.

11. A slicing machine comprising a table, a screw spindle journaled on said table, ratchet mechanism for operating said screw spindle, a cam for controlling said ratchet mechanism, a pinion for rotating said cam, a rack meshing with said pinion, a spring-held guide for retaining said rack in mesh with said pinion, and means for shifting said rack to adjust the position of said cam.

12. In a slicing machine, a table, a work support slidably mounted on said table, a screw spindle on said table at one side thereof and connected with said work support, ratchet mechanism for rotating said screw, a cam for controlling said ratchet mechanism, a pinion for rotating said cam, a rack meshing with said pinion, a spring-held guide for holding said rack in mesh with said pinion, a hand wheel, a pinion arranged to be rotated by said hand wheel, said rack having teeth thereon meshing with said last-named pinion, and a spring-held guide for holding said rack in mesh with said last-named pinion.

13. A slicing machine comprising a table, spaced brackets mounted at one edge of said table, a tubular guide supported by said brackets, a screw spindle journaled in said guide, one end of said spindle projecting beyond one of said brackets, ratchet mechanism mounted on the projecting end of said spindle, a housing supported by said bracket and enclosing said ratchet mechanism, and a cover for said tubular guide mounted on said bracket.

14. A slicing machine comprising a table, a pair of spaced brackets mounted on said table, a tubular guide supported by said brackets, a screw spindle journaled in said guide, a work support having one edge thereof slidably mounted at the side of said table opposite said brackets, a sleeve slidably mounted on said guide and detachably secured to the other edge of said work support, said sleeve and guide having registering openings through the walls thereof, a lever pivoted on said sleeve, a segmental nut mounted on said lever and extending through said openings and engaging the threads on said spindle, a plunger rod mounted on said work support and engaging said lever to release said segmental nut from said screw spindle, and a handle mounted on said work support for operating said plunger rod.

15. A slicing machine comprising a table, a pair of spaced brackets mounted on said table, a tubular guide carried by said brackets, a screw spindle journaled in said guide, a work support disposed above said table and having the edge thereof opposite said screw spindle slidably mounted on said table, a sleeve slidably mounted on said guide and detachably connected to the edge of said work support adjacent said spindle and supported thereby clear of said table, and means for preventing upward movement of the work support at the edge thereof opposite said screw spindle.

16. A slicing machine comprising a table, a tubular guide mounted at one edge of said table, a screw spindle journaled in said guide, a sleeve slidably mounted on said guide, said sleeve having brackets extending laterally therefrom, dowel pins carried by two of said brackets, a work support having sockets therein for receiving said dowel pins, means for locking one of said dowel pins in its socket, another of said brackets having a slot in the upper face thereof, and means on said work support for engaging said slot to hold said sleeve and work support against relative lateral movement while permitting said work support to be lifted upwardly away from said bracket.

17. A slicing machine comprising a table, a tubular guide mounted at one side of said table, a sleeve slidably mounted on said guide, said guide having a slot extending longitudinally thereof, said sleeve having an opening therethrough registering with said slot, ears carried by said sleeve adjacent said opening, a pin mounted in said ears, a lever journaled on said pin, a segmental nut carried by said lever and projecting through said openings, a screw spindle journaled within said guide and meshing with said segmental nut, a spring for holding said segmental nut in mesh with the threads of said screw spindle, a work support detachably connected with said sleeve, a plunger rod slidably mounted on said work support and arranged to engage said lever to withdraw said segmental nut from said screw spindle, a spring for holding said plunger rod away from said lever, and a handle for moving said plunger rod to actuate said lever.

18. In a slicing machine, a work support, a screw spindle for feeding said work support, ratchet mechanism for operating said screw spindle, a handle for rotating said screw spindle, and a one-way driving connection between said handle and said screw spindle.

19. In a slicing machine, a work support, a screw spindle for feeding said work support, ratchet mechanism for operating said screw spindle, a handle for rotating said screw spindle, and a one-way driving connection between said handle and said screw spindle, said driving connection comprising a helical spring wound upon said screw spindle and having one end thereof attached to said handle.

20. A slicing machine comprising a work table, a feed screw spindle journaled within bearings on said table, a shoulder on said feed screw for limiting longitudinal movement thereof in one direction, a spring-pressed abutment member mounted within one of said bearings, and an anti-friction bearing interposed between one end of said feed screw spindle and said abutment member to hold said screw spindle in the position in which movement thereof is limited by said shoulder and prevent rotation of said spring by said feed screw.

21. A slicing machine comprising a work table, bearings on said work table, a feed screw journaled in said bearings, a shoulder on said feed screw, an abutment rigid with said table for engaging said shoulder to thereby limit longitudinal movement of said feed screw in one direction, a yielding member for urging said shoulder against said abutment, and an antifriction bearing interposed between said yielding means and said feed screw for preventing said feed screw from transmitting its turning effect to said yielding means so that energy will not be stored in said yielding means to cause a reverse movement of said feed screw.

In testimony whereof I have signed my name to this specification on this 11th day of November, A. D. 1927.

JOSEPH FOLK.